United States Patent [19]

Green

[11] 4,433,591

[45] Feb. 28, 1984

[54] REMOTE CONTROL SYSTEM

[75] Inventor: Edward A. Green, Mantua, Ohio

[73] Assignee: Eaton Corporation, Cleveland, Ohio

[21] Appl. No.: 321,366

[22] Filed: Nov. 16, 1981

[51] Int. Cl.[3] .................. G05G 11/00; G05G 5/06
[52] U.S. Cl. ............................. 74/479; 74/527;
        74/529; 74/531
[58] Field of Search ............ 74/479, 480 R, 480 B,
        74/481, 482, 483 R, 527, 529, 531

[56]  References Cited
U.S. PATENT DOCUMENTS

| 2,671,827 | 3/1954 | Slay | 74/527 X |
|---|---|---|---|
| 2,702,615 | 6/1951 | Morse | 192/96 |
| 3,128,738 | 3/1963 | Farrington et al. | 114/146 |
| 3,286,544 | 11/1963 | Gilmore et al. | 74/483 |
| 3,556,270 | 1/1971 | Comment | 74/531 X |
| 3,651,709 | 3/1972 | Booty | 74/483 R |
| 3,842,689 | 10/1974 | Bagge | 74/479 |
| 3,958,524 | 5/1976 | Cantley et al. | 114/146 |
| 4,020,713 | 5/1977 | Cantley et al. | 74/479 |
| 4,119,000 | 10/1978 | Venable | 74/479 |

Primary Examiner—Allan D. Herrmann
Attorney, Agent, or Firm—C. H. Grace; A. E. Chrow

[57] ABSTRACT

Disclosed is a control system for controlling at least one device from either first or second operating control stations. The system comprises a first body member that has one end connected to the device by suitable means such as a push-pull cable and the other end rotatably mounted on a frame. A second body member is rotatably mounted on the first body member in such a manner as to rotate in the plane of rotation of the first body member. The second body member is connected separately to the first and second control stations by suitable means such as push-pull cables and has securement means associated therewith such that movement of the controls at the first station causes the second body member to secure the controls at the second station while controlling the device by rotating the first body member in an opposite direction to the direction of rotation of the second body member and movement of the controls at the second station causes the second body member to secure the controls at the first station while controlling the device by rotating the first body member in the same direction as the second body member.

18 Claims, 6 Drawing Figures

REMOTE CONTROL SYSTEM

INTRODUCTION

This invention relates generally to a system for remotely controlling one or more devices and more particularly to such system that permits one or more devices such as the spool of an hydraulic valve or an automatic transmission to be independently controlled from either one of two remote operating control stations.

BACKGROUND OF THE INVENTION

Mechanisms have been provided in the past for selectively converting one of a plurality of remote input motions into a secondary output motion. Such mechanisms are typically used in conjunction with marine craft steering and motor mechanisms controlled from separate remote operating stations.

An example of a control mechanism used in a dual control for marine craft can be found in U.S. Pat. No. 2,702,615 which discloses separate forms of the mechanism respectively operatively connected to the motor throttle and clutch and to the remote operating station controls by means of push-pull cables. Actuation of the throttle control from either station automatically adjusts the clutch while disabling the throttle and clutch control at the other station location. The mechanism however requires a complex and costly combination of external sliding and rotational components which are subject to varying environmental conditions.

Examples of dual remote operating station controls that require additional manual auxilliary means to disable the controls at one station while operating the other can be found in U.S. Pat. Nos. 3,128,738; 3,286,544; 3,651,709; 3,958,524; and 4,020,713. The devices disclosed therein however generally have costly complex designs that require additional exposed hardware that is likewise subject to varying environmental conditions.

An example of a system for controlling the carburetor of a motor and the like from one of two or more remote operating stations that does not utilize complex rotational or combinations of complex rotational and sliding components or require the additional auxilliary manual means previously described, can be found in U.S. Pat. No. 3,842,689 which discloses a system that utilizes a plurality of sliding bars disposed adjacent each other in a housing. Although the system may be used to advantage, its use may, under certain conditions, result in dislodgement between the bars and loss of control from both of the operating stations.

SUMMARY OF THE INVENTION

Accordingly, it is an object of this invention to provide a control system having a minimum number of moving components that in combination enable one or more devices to be controlled remotely from either one of two operating control stations.

It is another object of this invention to provide a control system for controlling one or more devices from either one of two remote operating control stations that is inexpensive and easily maintained.

It is yet a further object of this invention to provide a control system for controlling one or more devices remotely from either one of two operating control stations that utilizes only simple rotational movement of components that can be enclosed for protection from adverse environmental conditions.

It is still a further object of this invention to provide a control system for controlling one or more devices from either one of two operating stations that is designed so as not to be susceptable to dislodgement and assures operative control over the device at all times.

BRIEF DESCRIPTION OF THE DRAWINGS

FIG. 3 is a top plan view of another embodiment of the control system of the invention.

DESCRIPTION OF PREFERRED EMBODIMENTS

Figure 1:
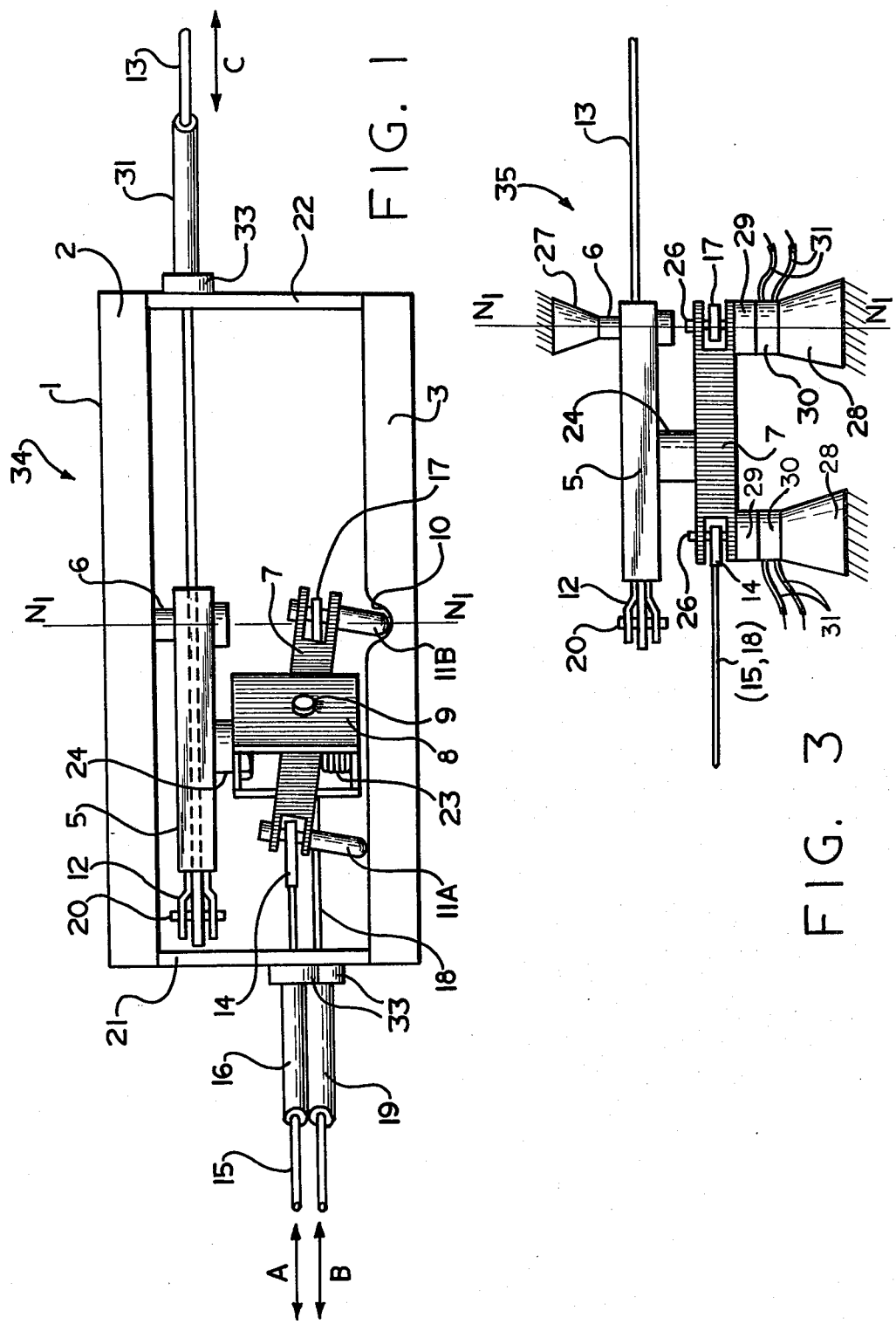
FIG. 1 is a top plan view of an embodiment of the control system of the invention.
Figure 2:
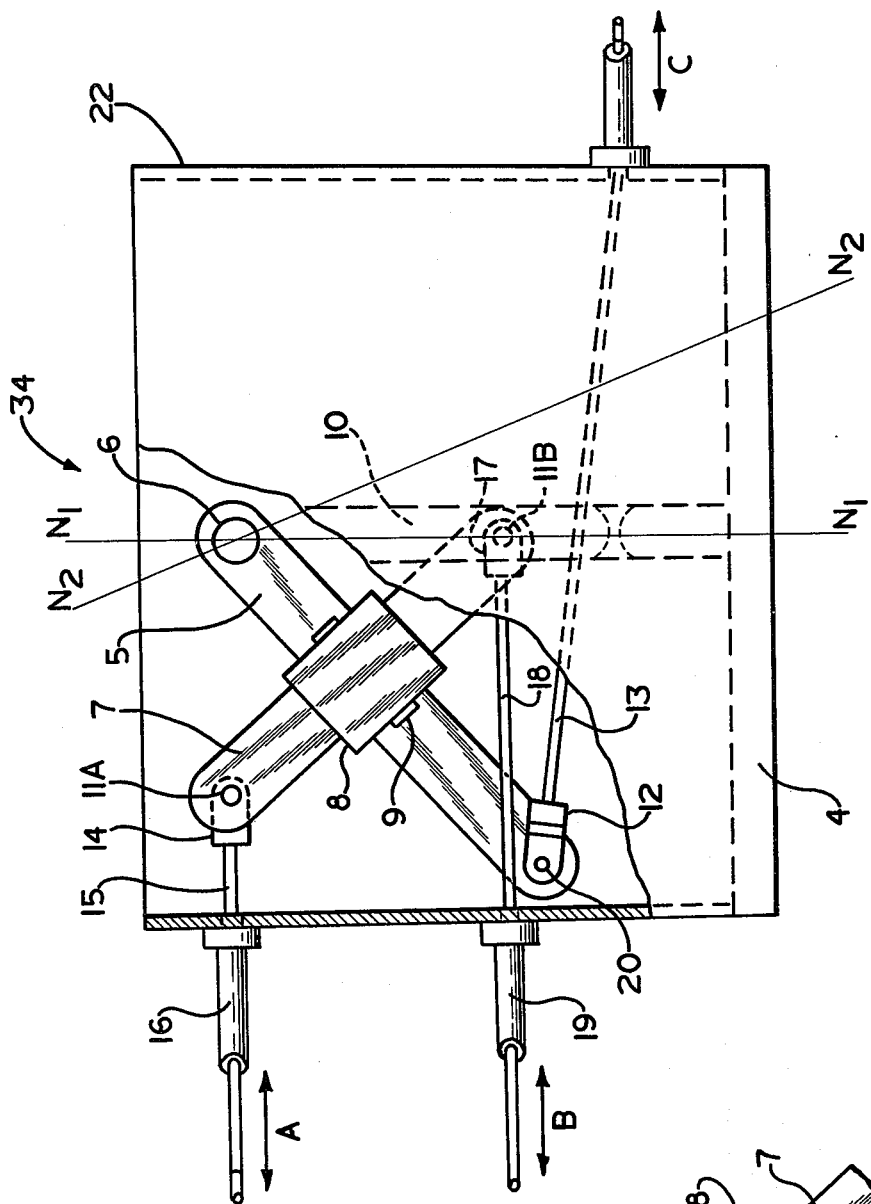
FIG. 2 is a front side elevation view of the embodiment of the control system shown in FIG. 1.

FIGS. 1 and 2 respectively show a top plan view and front side elevation view of a preferred embodiment 34 of the control system of the invention with the top removed. System 34 has a frame 1 having apposed, substantially parallel, facing back wall 2 and front wall 3 spaced apart by means of bottom wall 4 and side walls 21 and 22. One end of first body member 5, in the form of a plate, arm, rod or other suitable shape, is rotatably mounted on the side of wall 2 facing wall 3 by rotatable mounting means 6. Mounting means 6 may be any suitable means of mounting body member 5 to wall 2 that is strong enough to support and permit member 5 to rotate relative to wall 2 and control device "C" as hereinafter described. The opposite end of member 5 is connected to device "C" by a connecting means in the form of flexible cable 13 which exits frame 1 through an opening (not referenced) in side wall 21. Cable 13 is slidingly disposed within outer protective jacket 31 which is secured against movement with respect to frame 1 by being secured to wall 22 by securement means 33. Securement means 33 may be any means such as a clamp or other device that is able to secure jacket 31 from movement with respect to frame 1 so that cable 13 is able to slide freely therewithin. Although any suitable means such as a rod or a flexible cable by itself may be used to connect device "C" to member 5, it is preferred to use a push-pull cable such as shown in FIGS. 1 and 2 that is preferably connected to member 5 by means of yoke 12 that is secured to the cable and connected to member 5 by pin 19 or other suitable means. When the means connecting device "C" to the opposite end of member 5 is a flexible cable, it must necessarily be able to deflect to account for the arc traversed by the opposite end of member 5 as member 5 rotates about rotatable mounting 6 such as shown in FIG. 2. Device "C" may be the spool of a hydraulic valve or a component of an automatic transmission or series of such spools or automatic transmission components or any other device or series of devices that are able to be controlled by the movement of connecting means 13. Although it is preferred that member 5 rotate in a plane that is substantially parallel to wall 2 and that walls 2 and 3 be substantially parallel for the embodiment of control system 34 shown in FIGS. 1 and 2, it is to be understood that embodiments of the control system of the invention include those in which walls 2 and 3 are not substantially parallel and in which member 5 does not rotate in a plane that is substantially parallel to wall 2 and, as hereinafter described with respect to FIG. 3, those in which there is no front wall 3, or back wall 2 in combination with front wall 3 such as shown in FIGS. 1 and 2 provided that the particular embodiment of the invention is able to control device "C" from either one of two remote operating station controls by the use of two rotatable members as hereinafter described.

Second body member 7 in the form of a plate, arm, rod or other suitable shape is rotatably mounted between a first and second end thereof to member 5 between mounting means 6 and the opposite end thereof by means of rotatable mounting means 24 which although shown in the form of a pivot can be any suitable means of rotatably mounting member 7 to member 5 that is able to support and permit member 7 to rotate in a plane that is substantially parallel to the plane of rotation of member 5.

The first end of second body member 7 is connected to the controls located at first operating station "A" by a connecting means in the form of cable 15 which is connected to member 7 adjacent to the first end thereof by means of clevis 14. Cable 15 exits frame 1 through an opening in wall 22 (not referenced) and is slidingly disposed within outer protective jacket 16 which is secured against movement with respect to frame 1 by being secured to wall 21 by securement means 33 previously described with respect to cable 13 so that movement of the controls at station "A" cause cable 15 to slide within jacket 16 to move the first end of body member 7. Although it is preferred to use a push-pull cable such as the combination of cable 15 and jacket 16, it can be readily appreciated that any means may be used, such as a flexible cable alone or other suitable linkage, that is able to move the first end of member 7 in response to movement of the station "A" controls and cause member 7 to rotate in the manner hereinafter described. Like cable 13, cable 15 must necessarily be able to deflect to account for the arc traversed by the first end of member 7 when the first operating station "A" control is moved from its neutral position.

The second end of second body member 7 is connected to the controls located at station "B" by a connecting means in the form of cable 18, which, like cable 15, exits frame 1 through an opening in wall 22 (not referenced) and is slidingly disposed within outer protective jacket 19 that is secured against movement with respect to frame 1 by being secured to wall 21 by securement means 33 previously described with respect to cables 13 and 15. Although jackets 16 and 19 are shown as being preferably secured to wall 21 and jacket 31 is shown as being preferably secured to wall 22, they may be secured at any location between frame 1 and their respective control stations so long as they are suitably secured against movement with respect to frame 1. Cable 18 is connected to the second end of body member 7 adjacent the second end thereof by means of clevis 17 and, although preferably in the form of a push-pull cable, may be any connecting means, such as a flexible cable alone or other suitable linkage, that is able to move the second end of member 7 in response to movement of the station "B" controls in the manner hereinafter described. Like cable 15, cable 18 must necessarily be able to deflect to account for the arc traversed by the second end of member 7 when the second operating station "B" control is moved from its neutral position.

Figure 2B:
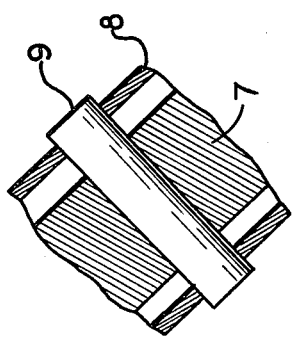
FIG. 2B is a partial view of cage 8 as viewed in FIG. 2 with the end thereof and member 7 removed.

In the preferred embodiment of control system 34, member 7 is mounted within rotatable cage 8. Cage 8 is rotatably mounted to member 5 by rotatable means 24 in the form of a pin or bolt or other type of pivot and rotates thereabout so as to permit member 7 to rotate in a plane that is substantially parallel to the plane of rotation of member 5. Member 7 is also rotatably mounted within cage 8 by rotatable mounting means 9 such as shown in FIG. 2B, in the form of a rod, pin, bolt, bearing, or other suitable means, that permits both the first and second ends of member 7 to rotate toward and away from wall 3. A portion of wall 3 is broken away in FIG. 2 for purposes of clarity in showing a portion of body members 5 and 7 and cage 8 shown in FIG. 1.

Neutral axis "$N_1$" shown in FIGS. 1 and 2, is the position on frame 1 corresponding to the neutral position of the controls located at operating stations "A" and "B". Although referred to herein as the "neutral position" it is to be understood that the term includes the "park" position where the control system of the invention is used to control a transmission such that the term "neutral position" includes embodiments when both the first and second ends of member 7 are secured against movement when both the operating station "A" and "B" controls are in the neutral position or where only one control is in the neutral position and the other control is in the park position or where both of the controls are in the park position. Groove 10 is disposed along axis "$N_1$" as a preferred means by which both the first and second ends of member 7 are able to be secured to wall 3 along a single neutral axis. The first and second ends of member 7 are secured in groove 10 by means of protuberances 11 A and 11 B extending respectively therefrom towards wall 3. When the controls of both operating stations "A" and "B" are in their respective neutral positions, members 5 and 7 are aligned along axis "$N_1$" with protuberances 11 A and 11 B extending into groove 10 to secure both ends of member 7 to wall 3. While protuberance 11 B may be located at any point between the second end of member 7 and the point at which member 7 is rotatably mounted to member 5, it is preferred that protuberance 11 B extend adjacent the second end of member 7 from the point at which member 7 is connected by cable 18 to the controls at operating station "B" as shown in FIGS. 1 and 2. The location of protuberance 11 A is however more critical in that protuberance 11 A is required to align with the axis of rotation of rotatable mounting means 6 when member 7 is aligned parallel with neutral axis "$N_1$". As such, it is readily apparent that, although it is preferred that protuberance 11 A and the point of connection of cable 15 to the first end of member 7 be located adjacent at the first end of member 7 as shown in FIGS. 1 and 2, protuberance 11 A may be located away from the first end toward the point at which member 7 is rotatably mounted to member 5 provided that protuberance 11 A aligns with the axis of rotation of rotatable means 6 when member 7 is aligned parallel with axis "$N_1$" and that cable 15 is required to be connected to member 7 at the point at which protuberance 11 A extends from member 7 toward wall 3 or at point along member 7 that is between the point at which member 7 is rotatably mounted to member 5 and the point at which protuberance 11 A extends from member 7. Protuberances 11 A and 11 B may be secured to member 7 in any suitable manner such as welding or other suitable method and may extend through member 7 to provide a means for connecting means 14 and 18 to be secured to member 7 as shown in FIG. 1. Although shown in the form of a round ended dowel, protuberances 11 A and 11 B may have any shape that is able to secure member 7 in groove 10 in the manner hereinafter described.

Groove 10 and protuberances 11 A and 11 B are positioned and dimensionally adapted such that, when the controls at operating station "A" and "B" are in their respective neutral positions, members 5 and 7 are aligned along axis "$N_1$" with protuberances 11 A and 11 B extending into groove 10 to secure member 7 to wall 3 of frame 1 as previously described.

In the position of members 5 and 7 shown in FIGS. 1 and 2, the control at operating station "A" has been moved from its neutral position in such a manner as to pull cable 15 to the viewer's left which in turn has pulled the first end of body member toward the viewer's left to disengage protuberance 11 A from groove 10 while protuberance 11 B remains moveably secured to groove 10. As a result of such movement, protuberance 11 A begins to ride on the surface of wall 3 facing wall 2, as shown in FIG. 1, and cause member 7 to rotate clockwise about rotatable mounting means 9 as viewed in FIG. 1 such that the first end of member 7 disengages from groove 10 by rotating away from wall 3 out of groove 10 while the second end of member 7 rotates towards wall 3 so as to press protuberance 11 B into groove 10 to enhance the moveable securement of the second end of member 7 therein while member 7 also rotates counterclockwise about the point of moveable securement between protuberance 11 B and groove 10. In rotating counterclockwise about the point at which protuberance 11 B secures member 7 to groove 10, member 7 and cage 8 rotate relative to member 5 about rotatable means 24 and exert a force upon member 5 that causes member 5 to rotate in an opposite clockwise direction about rotatable mounting 6 which causes member 5 to move to the viewer's left and control device "C" by moving cable 13 to the left while the controls at operating station "B" remain secured in their neutral position. In rotating about rotatable mounting 6, member 5 necessarily causes protuberance 11 B to move upward along groove 10 to account for the upward movement of member 7 caused by the rotational movement of member 5. Although it is preferred to have a single groove 10, understandably, protuberance 11 A does not require a groove 10 since it is not subjected to lateral movement because members 5 and 7 both rotate fixedly about the axis of rotation of mounting means 6 and therefore a suitably dimensionally adapted depression may be used if desired in place of a groove for securing protuberance 11 A to wall 3. Likewise, two grooves may be used to separately secure protuberances 11 A and 11 B to wall 3 along axis "$N_1$" provided that the groove for securing protuberance 11 B extends for a distance in both directions along axis "$N_1$" to account for the upward and downward movement of member 7 caused by the rotation of member 5 in either a clockwise or counterclockwise direction in response to the direction in which the control is moved at operating station "A".

Figure 2A:
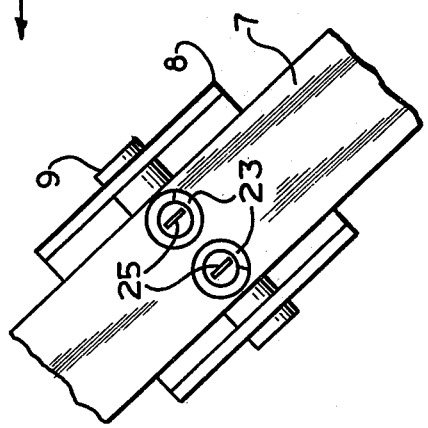
FIG. 2A a partial view of member 7 showing cage 8 as viewed in FIG. 2 with the end removed.
Figure 2C:
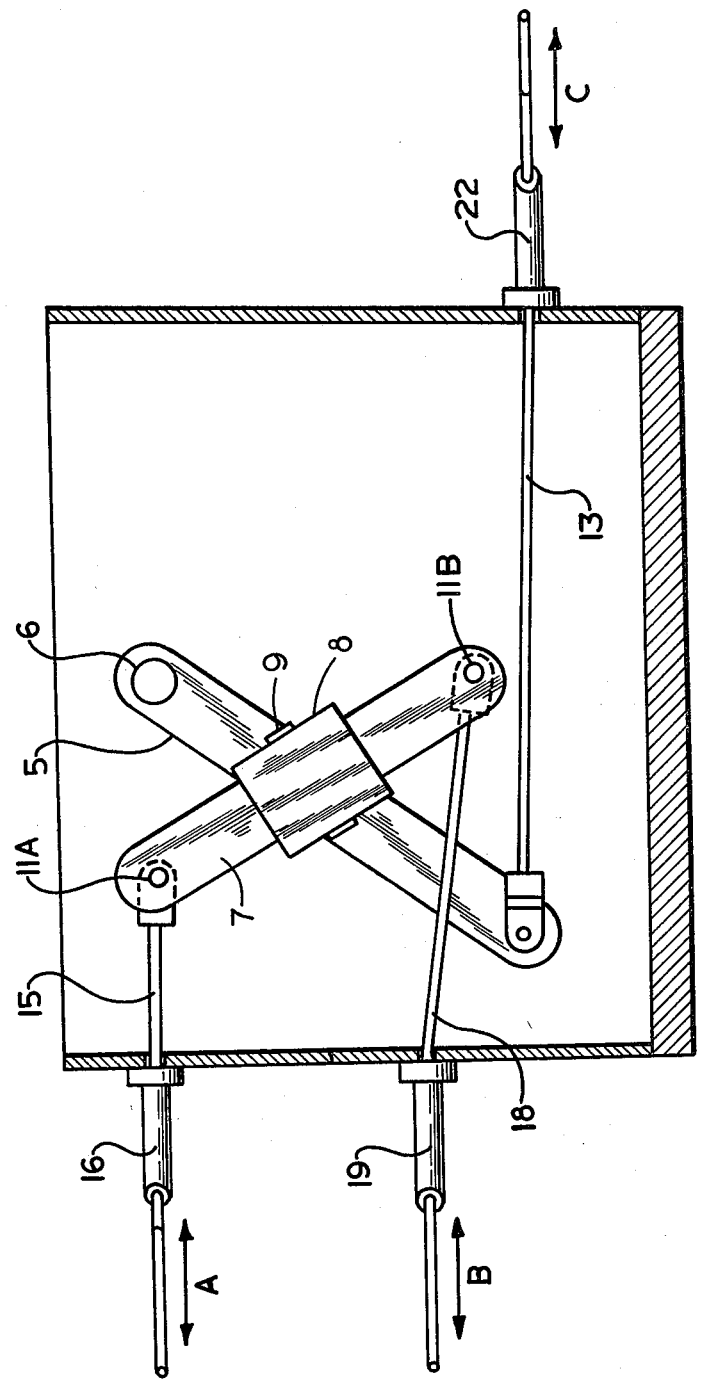
FIG. 2C is a front side elevation partial view of the embodiment of the control system of FIG. 2 after movement of the controls at operating station A.

Although the position of members 5 and 7 are shown in FIGS. 1 and 2 as a result of moving the control at station "A" in such a manner as to pull the first end of member 7 to the viewer's left, it is to be understood that movement of the control at station "A" in such a manner as to push the first end of member 7 towards the viewer's right will likewise disengage protuberance 11 A from groove 10 and cause protuberance 11 B to remain moveably secured in groove 10 in the manner previously described while rotating member 7 clockwise about its point of rotatable securement with member 5 as viewed in FIG. 1 which in turn causes member 5 to rotate in an opposite clockwise direction relative to member 7 about rotatable mounting 6 and control device "C" by movement of the means connecting device "C" to member 5. As an illustrative example, FIG. 2C shows the effect of moving cable 15 a small distance to the viewer's right from the position shown in FIG. 2. In this case protuberance 11B remains moveably secured to groove 10 while member 7 rotates clockwise thereabout which causes member 5 to rotate counterclockwise about rotatable mounting means 6 which pushes cable 13 to the viewer's right.

Although members 5 and 7 rotate in opposite directions relative to each other when the control located at station "A" is moved from its neutral position as previously described, such is not the case when the control at station "B" is moved because of the previously described requirement that protuberance 11 A align axially with the center of rotation of rotatable mounting means 6. Returning to the condition where the controls at operating stations "A" and "B" are in their respective neutral position, with members 5 and 7 aligned parallel with axis "$N_1$" and both ends of members 5 and 7 secured in groove 10 against movement with respect to frame 1 by means of protuberances 11 A and 11 B extending into groove 10, movement of the control at operating station "B" is able to control device "C" in the manner hereinafter described while the control at operating station "A" remains secured against movement from its neutral position. Groove 10 and protuberance 11 A are positioned and dimensionally adapted such that movement of the control at operating station "B" from its neutral position is able to move cable 18 which moves the second end of member 7 such that protuberance 11 B moves out of and disengages the securement between protuberance 11 B and groove 10 and rides along the inner surface of wall 3 facing wall 2 which in turn causes member 7 to rotate either clockwise or counterclockwise about rotatable mounting means 9 depending on the direction of rotation of member 7 such that protuberance 11 A moves towards wall 3 to fixedly secure member 7 to groove 10 at the axis of rotation of rotatable mounting means 6. Since both members 5 and 7 are adapted to rotate about the axis of rotation of rotatable mounting means 6, rotation of member 7 causes member 5 to rotate such that they both rotate together in the same direction thereabout with little, if any, substantial relative rotation therebetween rather than the previously described opposite relative rotation between members 5 and 7 when the control station "A" is moved from its neutral position.

Resilient means may be used where desired to enhance the securement between member 7 and wall 3. An example of one form of resilient means that has been found to be of advantage is shown in FIG. 1 in the form of coiled spring 23. Spring 23 is disposed against member 7 in such a manner as to bias the first and second ends of member 7 towards wall 3 of frame 1 to enhance the respective securement between protuberances 11 A and 11 B and groove 10. Although only a portion of one coiled spring is shown in FIG. 1, the preferred embodiment of control system 34 utilizes two such springs 23 as shown in FIG. 2A that are spaced-apart and secured such as for example by tabs 25 between member 7 and cage 8 along the central axis of rotation of rotatable mounting 9 and have their respective longitudinal axis parallel aligned in such a manner as to bias protuberance 11 B toward groove 10 when the operating station "A" control is moved from its neutral position to disengage protuberance 11 A from groove 10 and also bias protuberance 11 A toward groove 10 when the operating station "B" control is moved from its neutral position to disengage protuberance 11 B from groove 10 as previously described.

Neutral axis "$N_2$" is shown in FIG. 2 to illustrate that, although preferable, the neutral position of securement on wall 3 of frame 1 corresponding to the neutral position of the controls at operating station "B" does not necessarily have to lay along axis "$N_1$" as shown in FIGS. 1 and 2. Depending upon the point of rotatable securement between members 5 and 7, the member 7 may be moveably secured to wall 3 of frame 1 along an axis, such as axis "$N_2$", having one point located at the axis of rotation of rotatable mounting means 6 within a curved area transversed by rotation of the length of member 7 between the second end thereof and the point at which member 7 is rotatably mounted to member 5 when members 5 and 7 are aligned parallel to each other and rotate together about rotatable mounting 6 provided that movement of the control at station "B" from its neutral position is still able to control device "C". Although other neutral axis may be used, it is preferred that the means for securing member 7 to wall 3 be disposed along axis "$N_1$" as previously described such that connecting means connecting member 7 to the control at operating stations "A" and "B" are positioned substantially orthoginal to axis "$N_1$" when the operating station controls are in their neutral position.

FIG. 3 shows a top plan view of an embodiment 35 of the control system of the invention that features an electro-magnetic means for securing previously described second body member 7 to a neutral position on the frame corresponding to the position at which operating station "A" and "B" controls are in their respective neutral positions. In FIG. 3, first body member 5 is rotatably mounted at one end to support 27 by rotatable mounting means 6 as previously described with respect to embodiment 34 of the control system of the invention. Support 27 may be any means of support to which member 5 is able to be suitably rotatably mounted which permits member 5 to rotate in a plane relative thereto and control device "C" when either of the controls located at operating stations "A" and "B" are moved from their respective neutral positions. The opposite end of member 5 is connected to the device "C" to be controlled by means of flexible cable 13 that is attached to the opposite end of member 5 by means of yoke 20 and pin 20 previously described with respect to embodiment 34 of the control system of the invention. Second body member 7 is rotatably attached to member 5 by pivot means 24 and has a first end connected to the controls located at operating station "A" and a second end connected to the controls located at operating station "B" by previously described flexible cables 15 and 18 that are connected respectively to member 7 by clevis 14 and clevis 17 by pins 26. The position of members 5 and 7 is substantially the same as shown in FIGS. 1 and 2 with respect to embodiment 34 of the control system of the invention and as such, the front side elevation view of embodiment 35 is not shown. It is to be noted that embodiment 35 does not include rotatable mounting means 9 or protuberances 11 A and 11 B and groove 10 previously described with respect to embodiment 34 of the control system of the invention. In place of groove 10 are electro-magnets 30 mounted on support 28 that are respectively powered electrically by means of electrical conductors 31 attached to each. Although not shown in FIG. 3, a second electro-magnet 30 is positioned below the electro-magnet 30 along neutral axis "$N_1$" shown in FIG. 3 such that it corresponds to the groove 10 to which protuberance 11 B is secured as previously described with respect to embodiment 34. The electro-magnet 30 closest to the viewer is mounted on support 28 such that it is aligned with the axis of rotation of rotatable mounting 6 as previously described with respect to the relationship between protuberance 11 A and groove 10 of embodiment 34. Since member 7 is aligned parallel with member 5, cable 15 is directly over cable 18 and as such, they are referenced collectively in FIG. 3. Magnetic material 29 is secured respectively to the first and second ends of member 7 on the side thereof facing electro-magnets 30. Second body member 7 may itself be made from a magnetic material with protuberances that extend towards electro-magnets 30 in place of separate magnetic materials 29. Electro-magnets 30 are respectively electrically connected to the controls at operating stations "A" and "B" in such a manner that they are able to engage respectively with magnetic materials 29 and magnetically secure member 7 against movement with respect to supports 27 and 28 when member 7 is aligned with neutral axis $N_1$ and the controls at operating stations "A" and "B" are in their respective neutral positions. Electro-magnets 30 are electrically connected respectively to the controls at operating stations "A" and "B" by means of electrical conductors 31 connected respectively therebetween in such a manner that movement of the control at operating station "A" from its neutral position is able to disengage the magnetic securement between the electro-magnet 30 and the magnetic material 29 disposed adjacent the first end of member 7 and cause member 7 to rotate in a direction opposite to the direction of rotation of member 5 as previously described with respect to embodiment 34 and cause cable 13 to move and control device "C" while the magnetic material 29 disposed adjacent second end of member 7 remains moveably magnetically secured to the electro-magnet 30 that secures the second end of member 7 to support 28. Likewise, movement of the controls at operating station "B" from its neutral position is able to disengage the magnetic securement between the electro-magnet 30 and the magnetic material 29 magnetically securing the second end of member 7 to support 28 and permit members 5 and 7 to rotate in the same direction about the axis of rotation of rotatable mounting means 6 and cause cable 13 to move and control device "C" as previously described with respect to embodiment 34. Except for the absence of a frame such as frame 1 and the rotatable mounting means 9 and protuberances 11 A and 11 B and groove 10 previously described with respect to embodiment 34 of the control system of the invention, the positional relationship between the components, rotational movement, and principals of operation of embodiment 35 is the same as previously described with respect to embodiment 34 of the control system of the invention. Although shown in FIG. 3 as having substantially flat, parallel aligned, facing surfaces, it is to be understood that magnetic materials 29 and electro-magnetics 30 may have any shape that permits members 5 and 7 to cooperate in the manner herein described.

Although the control system of the invention, including its component parts, described herein is preferably made from one or more metallic materials and more preferably from one or more corrosion resistant metallic materials, it may be made from any material or combination of materials suitable for a particular application. Likewise, although the use of push-pull cables to connect body member 7 to the controls located at operating stations "A" and "B" and body member 5 to the device "C" to be controlled are described herein as having an outer protective jacket, it is to be understood that the word "jacket" is not limited to a single layer jacket but includes any combination of one or more protective layers made from metallic and other materials well known to those ordinarily skilled in the art of push-pull cables.

Embodiments 34 and 35 of the control system of the invention illustrate that member 5 may be rotatably mounted on any suitable support and that the term "frame" as used herein includes any type frame or support or combination of supports to which members 5 and 7 and the means for securing member 7 against movement with respect to the frame can be mounted and cooperate in the manner described herein to control device "C" from either one of two operating control stations. Embodiments 34 and 35 of the control system of the invention likewise illustrate that the means disposed on the first and second ends of member 7 and on the frame to secure member 7 to the frame as described herein is not limited to protuberances 11 A and 11 B and groove 10 or the magnetic material 29 and electro-magnet 30 combination respectively described herein with respect to embodiments 34 and 35 of the control system of the invention and includes any means which secures and disengages the first and second end of second body member 7 against movement with respect to the particular frame used in the manner described herein when the controls at first operating station "A" and second operating station "B" are in their respective neutral positions of which either or both of the controls may, where desired, have additional means associated therewith for securing the control not being operated against movement from its neutral position when the other control is being used to control a device by the control system of the present invention.

What is claimed is:

1. An improved control system for controlling at least one device remotely from either first or second operating station controls of the type comprising:
   a frame;
   a first body member having one end rotatably mounted on the frame and adapted to rotate in a plane with respect to the frame and having means disposed between the rotatable mounting and the opposite end thereof connecting the first body member to the device to be controlled;
   a second body member rotatably mounted on the first body member between a first end and a second end thereof in such a manner that the second body member is able to rotate in a plane that is substantially parallel to the plane of rotation of the first body member, said second body member having means disposed between the first end thereof and the rotatable mounting between the first and second body members connecting the second body member to the first operating station control and having means disposed between the second end thereof and the rotatable mounting between the first and second body members connecting the second body member to the second operating station control; wherein the improvement is characterized by said system having:
   means disposed on the frame and on the second body member at the point at which the second body member is connected to the first operating station control for fixedly securing the second body member against movement with respect to the frame when the first operating station control is in a neutral position and the second operating station is moved from a neutral position;
   means disposed on the frame and on the second body member between the second end thereof and the rotatable mounting between the first and second body member for moveably securing the second body member to the frame when the second operating station control is in the neutral position and the first operating station control is moved from the neutral position;
   said securement means moveably securing the second body member end to the frame in such a manner that movement of the first operating station control from the neutral position is able to disengage the means fixedly securing the second body member against movement with respect to the frame while maintaining the moveable securement between the second body member and the frame so as to prevent control of the device by the second operating station control and cause the second body member to rotate about the point of moveable securement between the second body member and the frame and as a result of such rotation cause the first body member to rotate about the rotatable mounting between the first body member and the frame in a direction opposite to the direction of rotation of the second body member and control the device by movement of the means connecting the device to the first body member while permitting the point of moveable securement between the frame and the second body member to move with respect to the frame for a distance sufficient to account for the movement of the second body member caused by the rotation of the first body member;
   and said securement means fixedly securing the second body member against movement with respect to the frame in such a manner that movement of the second operating control from the neutral position is able to disengage the means moveably securing the second body member to the frame while maintaining the fixed securement between the second body member and the frame so as to prevent control of the device by the first operating station control and cause the first and second body members to rotate together in the same direction about the axis of rotation of the rotatable mounting between the first body member and the frame and control the device by movement of the means connecting the device to the first body member.

2. The control device of claim 1 wherein the frame comprises a pair of spaced-apart facing walls with the one end of the first body member rotatably mounted on the side of one of the walls and the means for fixedly securing the second body member to the frame and the means for moveably securing the second body member to the frame are disposed on the side of the other wall facing the first body member.

3. The control system of claim 2 wherein the walls are substantially parallel to each other.

4. The control system of claim 2 wherein the first body member rotates in a plane that is substantially parallel to the wall upon which the one end of the first body member is rotatably mounted.

5. The control system of claim 1 including rotatable means disposed between the first and second body members that enables the second body member first end to rotate toward and away from the means disposed on the frame for fixedly securing the second body member thereto and enables the second body member second end to rotate toward and away from the means disposed on the frame for moveably securing the second body member thereto.

6. The control system of claim 5 including resilient means disposed against the second body member in such a manner as to bias the second body member first and second ends respectively toward the frame to enhance the securement between the means disposed on the frame for respectively fixedly and moveably securing the second body member thereto.

7. The control system of claim 6 wherein the resilient means is in the form of at least one coiled spring.

8. The control system of claim 7 wherein the central longitudinal axis of the spring is positioned along the axis of rotation of the rotatable means that enables the second body member first and second ends to rotate toward and away from the means disposed on the frame for respectively fixedly and moveably securing the second body member thereto.

9. The control system of claim 2 wherein the securement means disposed respectively on the wall for fixedly and moveably securing the second body member to the wall comprises at least one groove disposed in the wall and said means disposed on the second body member for fixedly securing the second body member to the wall comprises a protuberance that extends therefrom towards the groove and said means disposed on the second body member for moveably securing the second body member to the wall comprises a protuberance that extends therefrom towards the groove, said groove and protuberances positioned and dimensionally adapted such that both protuberances are able to extend into the groove and secure the second body member to the wall when the first and second operating station controls are both in their respective neutral positions with said protuberance fixedly securing the second body member in the groove able to disengage therefrom when the first operating station control is moved from the neutral position while maintaining the moveable securement between the second body member and the wall and said protuberance moveably securing the second body member in the groove able to disengage therefrom when the second operating station control is moved from the neutral position while maintaining the fixed securement between the second body member and the wall.

10. The control system of claim 9 having two grooves disposed in the wall facing the first body member with one of the grooves corresponding to the neutral position of the first operating station control and the other groove corresponding to the neutral position of the second operating control.

11. The control system of claim 1 wherein the securement means disposed on the second body member for fixedly securing the second body member to the frame is a magnetic material and the means for moveably securing the second body member to the frame is a magnetic material and the securement means disposed on the frame for fixedly securing the second body member to the frame is an electro-magnet and the securement means disposed on the frame for moveably securing the second body member to the frame is an electro-magnet, said electro-magnets mounted on the frame and electrically connected respectively to the first and second operating controls in such a manner that the respective electro-magnets are able to engage with the respective magnetic material and magnetically secure the second body member to the frame when the first and second operating station controls are in their respective neutral positions with said electro-magnet fixedly magnetically secured to the respective second body member magnetic material able to disengage therefrom when the first operating station control is moved from the neutral position while maintaining the moveable magnetic securement between the second body member and the frame and with said electro-magnet moveably magnetically secured to the respective second body member magnetic material able to disengage therefrom when the second operating station control is moved from the neutral position while maintaining the fixed magnetic securement between the second body member and the frame and with said electro-magnet moveably magnetically secured to the respective second body member magnetic material able to disengage therefrom when the second operating station control is moved from the neutral position while maintaining the fixed magnetic securement between the second body member and the frame.

12. The control system of claim 1 wherein the means disposed on the second body member for fixedly securing the second body member to the frame and the means connecting the second body member to the first operating station control are both disposed adjacent to the second body member first end.

13. The control system of claim 1 wherein the means disposed on the second body member for moveably securing the second body member to the frame and the means connecting the second body member to the second operating station control are both disposed adjacent to the second body member second end.

14. The control system of claim 1 wherein the means respectively connecting the second body member to the first and second operating station controls comprise flexible cables.

15. The control system of claim 1 wherein the means connecting the first body member to the device to be controlled comprises a flexible cable.

16. The control system of claim 13 or 14 wherein the flexible cable is slidingly disposed within an outer protective jacket that is secured against movement with respect to the frame.

17. The control system of claim 1 wherein the device to be controlled is the spool of a hydraulic valve.

18. The control system of claim 1 wherein the device to be controlled is an automatic transmission.

* * * * *